United States Patent [19]

Staesche

[11] Patent Number: 5,772,058
[45] Date of Patent: Jun. 30, 1998

[54] COLLAPSIBLE ARTICLE DIVIDER AND SUPPORT

[76] Inventor: Maria M. Staesche, 6449 N. Talman, Chicago, Ill. 60645

[21] Appl. No.: 810,147

[22] Filed: Feb. 25, 1997

[51] Int. Cl.[6] .................................................. B65D 1/24
[52] U.S. Cl. .............................. 220/6; 220/520; 220/531; 220/557; 224/542
[58] Field of Search .................................. 224/542, 539, 224/42.34, 42.33, 402, 404; 220/6, 666, 507, 528, 529, 530, 531, 520, 557

[56] References Cited

U.S. PATENT DOCUMENTS

| | | | |
|---|---|---|---|
| 3,404,818 | 10/1968 | Miscoe | 224/42.42 |
| 3,986,656 | 10/1976 | Dickinson | 229/15 |
| 4,718,584 | 1/1988 | Schoeny | 224/42.42 |
| 5,052,580 | 10/1991 | Khoury | 224/542 |
| 5,163,569 | 11/1992 | Buff | 224/42.34 |
| 5,379,906 | 1/1995 | Levin et al. | 211/195 |
| 5,419,471 | 5/1995 | Polumbaum et al. | 224/42.42 |
| 5,518,170 | 5/1996 | Rasmussen | 224/42.34 |
| 5,526,972 | 6/1996 | Frazier et al. | 220/531 |
| 5,597,193 | 1/1997 | Conner | 224/404 |

FOREIGN PATENT DOCUMENTS 2 127 780  4/1984  United Kingdom ................... 220/528

Primary Examiner—Stephen J. Castellano
Attorney, Agent, or Firm—Myers & Associates, Ltd

[57] ABSTRACT

A collapsible article divider and support having a plurality of pivotally interconnected vertical panels capable of forming one or more article receiving and supporting compartments. The divider and support is foldable to a flat transport and storage configuration. A plurality of rigid rods are permanently affixed to divider and support and are foldable with the panels.

14 Claims, 8 Drawing Sheets

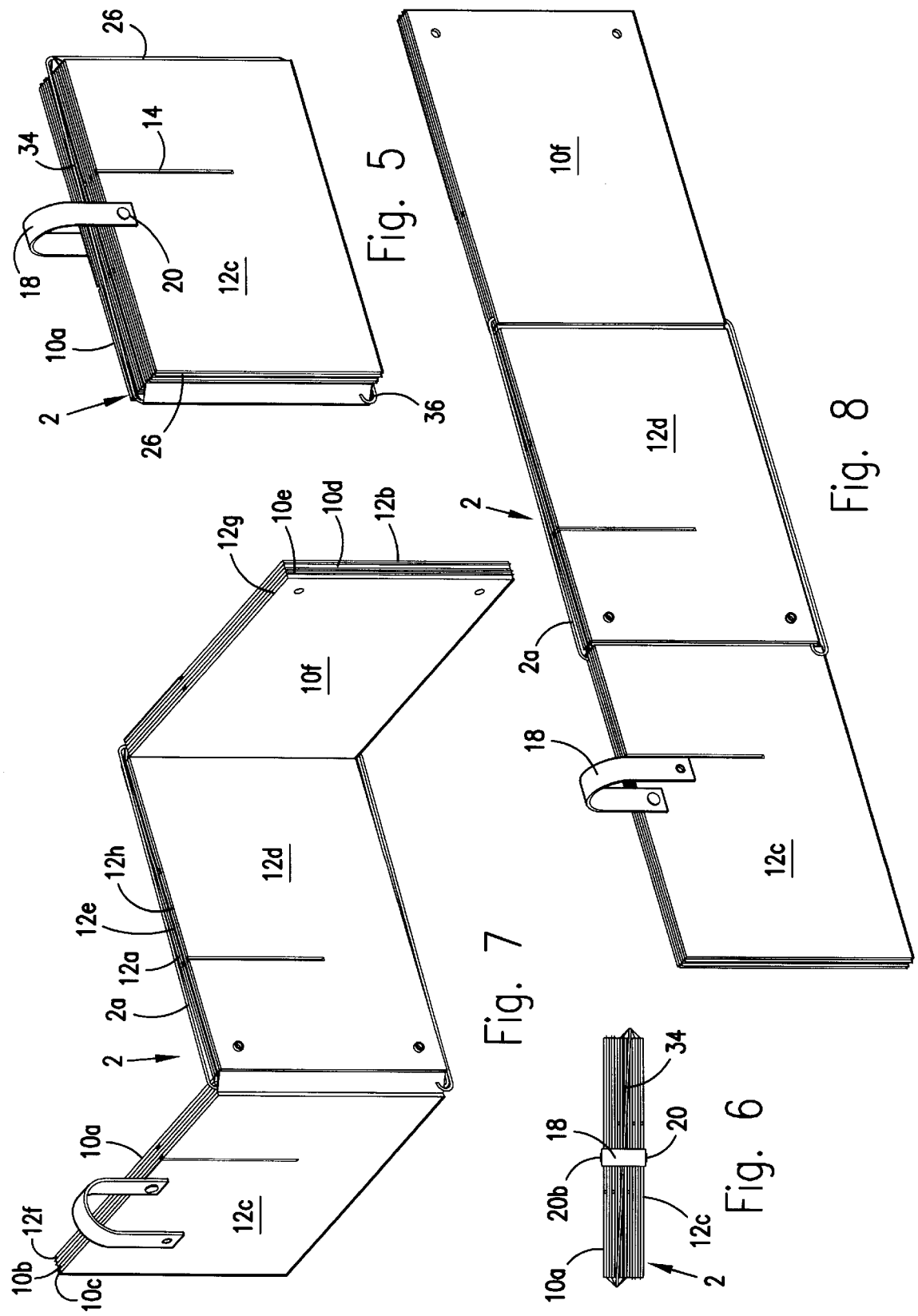

COLLAPSIBLE ARTICLE DIVIDER AND SUPPORT

BACKGROUND OF THE INVENTION

1. Field of the Invention

This invention relates to dividers and, more particular, to a collapsible divider which serves to support articles, such as bags of groceries and the like.

2. Summary of the Prior Art

In many situations, containers of articles, such as bags of groceries, cartons of food or other items, are transported in trunks of vehicles and in the cargo space of a truck, or are temporarily stored at loading areas and docks. Because bags of groceries and the like are difficult to maintain in an upright position, their contents can spill over through motion of the vehicle or due to the lack of stability of the particular container in an upright orientation. To solve the problem of maintaining a package in an upright condition in a secure fashion, several types of organizers or dividers have been used in the past in which compartments are provided to maintain one or more packages in the truck of a vehicle and the like. These known compartmentalized dividers generally require assembly or disassembly for use or have a collapsible type configuration. Known designs of dividers requiring assembly are not convenient to use, since they require considerable effort to be erected in a vehicle for use and to be disassembled for removal to vacate the trunk or other space for other purposes after transporting packages. Such techniques that rely on assembly and disassembly also include separable critical parts that are subject to being lost inadvertently following disassembly.

Collapsible type package supports have also not provided desirable convenience in use. Many of the known collapsible dividers require some degree of assembly or are not foldable into a collapsed configuration which is compact enough to be easily stored. In addition, none of the prior designs allow for advantageous adjustment of the number of cells or compartments, the size of cells or compartments and an overall flexibility in the shape of the divider while being used. Accordingly, it is desirable in the prior art to provide an improved collapsible divider for separating and maintaining packages of articles for transport and storage in an upright position, preventing spillage of contents.

SUMMARY OF THE INVENTION

It is therefore an objective of this invention to provide an improved collapsible divider for separating and supporting packages of articles, such as, for example, bags of groceries, cartons of food or other items, plant life, and the like. The collapsible divider of the invention fits into normal size trunks, cargo spaces of vans or trucks, and may be used at stationary points where packages require support. The invention of the application is particularly useful to the consumer or to delivery personnel for maintaining bags of groceries in an upright condition in a manner to prevent spillage and damage to the contents being carried. The collapsible divider herein disclosed may be readily opened for use to accommodate a plurality of individual packages and bags into individualized compartments of any selected number, such as, for example, 8 separate storage and support areas. The divider of the invention may be constructed in a suitable paper or plastic material having sufficient rigidity to adequately support the packages being separated. The divider herein comprises a plurality of panels of equal size being pivotally interconnected as a unitary one piece item that requires no assembly of parts when being opened or folded. After use, the divider of the application is capable of being collapsed into a compact transported storage flat configuration by which it can be carried from place to place and easily stored at a location occupying minimal space. The dividers herein disclosed include self contained rigid elements for strength which are permanently attached to the divider such that their attachment or removal is not necessary. The size of the compartments may also be adjusted to accommodate smaller or larger items as are normally carried from place to place in a vehicle. The configuration of the collapsible divider herein may be unfolded in a manner to provide a customized number of compartments as needed for a particular use. The invention is easy to use, has enhanced rigidity to meet all service conditions, and has panels which are interconnected by hinge means to permit easy collapsibility.

BRIEF DESCRIPTION OF THE DRAWINGS

FIG. 5 is a front perspective view of the collapsible divider of FIG. 1 in a fully collapsed carrying configuration;

FIG. 6 is a top plan view of the collapsible divider of FIG. 5 in a collapsed carrying configuration;

FIG. 7 is a front perspective view of the collapsible divider of FIG. 1 in a folded configuration between the fully open position and the fully closed position;

FIG. 8 is a front perspective view of the collapsible divider of FIG. 1 in a folded configuration between the open position and the partially folded configuration of FIG. 7;

DESCRIPTION OF THE PREFERRED EMBODIMENT

Figure 1:
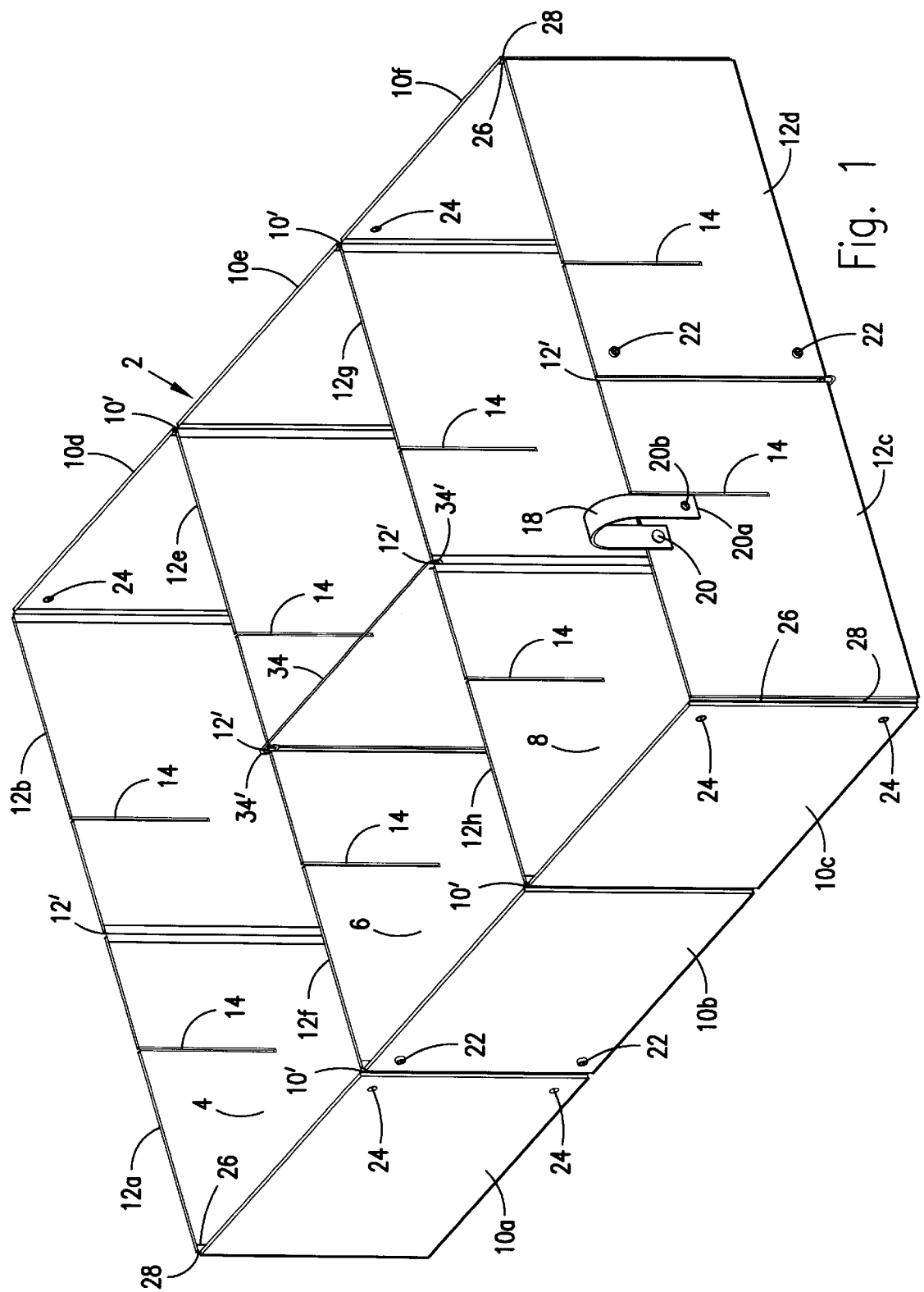
FIG. 1 is a side perspective view of the collapsible divider of the invention in a fully open configuration having separated open compartments.

Referring now to FIGS. 1 to 14, there is illustrated the collapsible article divider and support of the invention, generally designated by reference numeral 2. In FIGS. 1 to 4, the collapsible article divider 2 is shown in a fully open configuration forming three compartments 4, 6 and 8. The collapsible article divider 2 is formed by fourteen interconnected flat panels 10 and 12 to be described formed from a material such as, for example, a rigid plastic, paperboard or any other material capable of being lightweight and having suitable rigidity. Although the preferred embodiment shows the use of fourteen equal size panels in FIG. 1, it is within the scope of the invention to use other suitable number of panels to create dividers of other sizes. In addition, the dimensions of each of the panels 10 and 12 are equal in height and length to encompass a selected number of packages, such as shopping bags and the like, in a divided and suitably supported condition within divider 2. In use of the divider 2 for shopping bags, for example, each of the panels 10 may be of a length of fourteen inches and have a height of approximately ten inches, although the dimensions of the panels 10, 12 may be modified to conform to the intended use of the invention.

In the fully open configuration of FIGS. 1 to 4, the panels of the collapsible article divider 2 form a front wall including three front panels 10a, 10b and 10c interconnected at vertical seams 10' in a manner to be described and a back wall including panels 10d, 10e and 10f interconnected also at vertical seams 10'. In FIGS. 1 to 4, the side walls of the collapsible article divider are formed by identical panels 12a and 12b pivotally interconnected at seam 12' and opposed side walls 12c and 12d pivotally interconnected at seam 12' as will be described. In the fully open configuration of FIGS. 1 to 4, the compartments 4, 6 and 8 are separated by a pair of spaced rows of intermediate panels formed by panels 12e, 12f and spaced parallel panels 12g, 12h. The foregoing intermediate panels connect the front and back wall between seams 10'.

Figure 2:
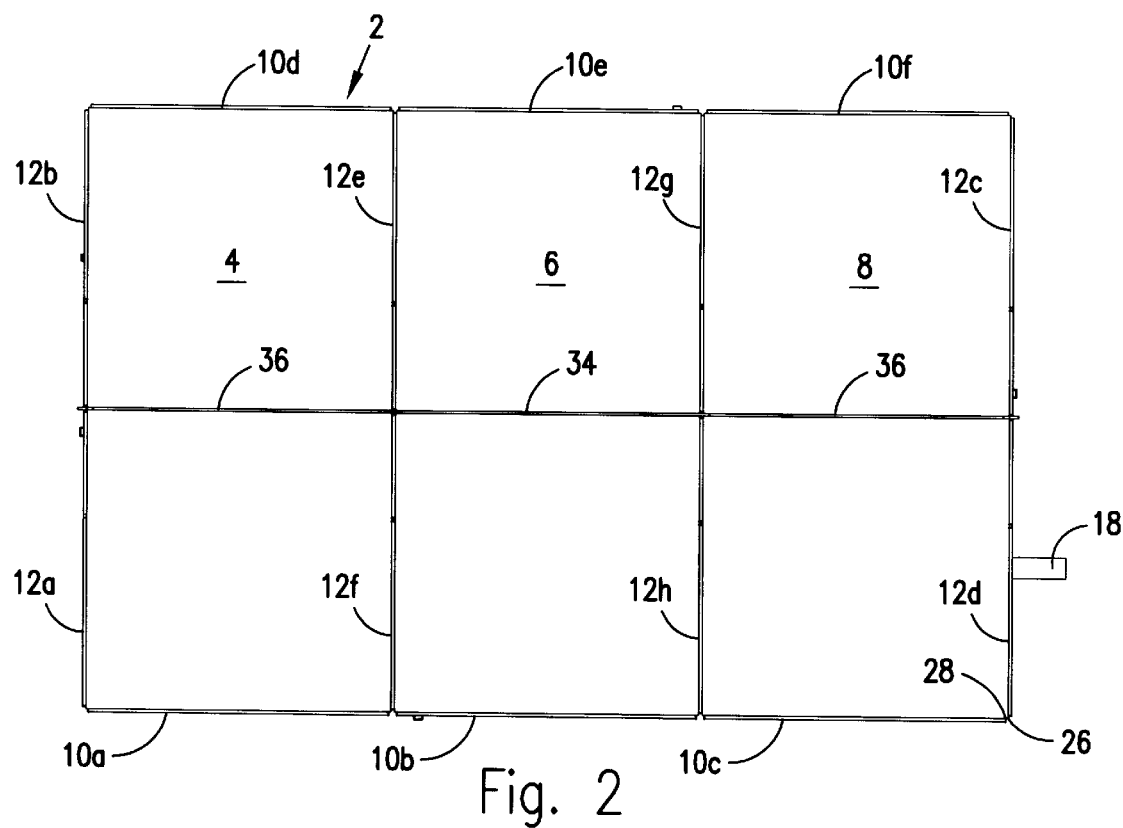
FIG. 2 is a top plan view of the collapsible divider of FIG. 1.
Figure 3:
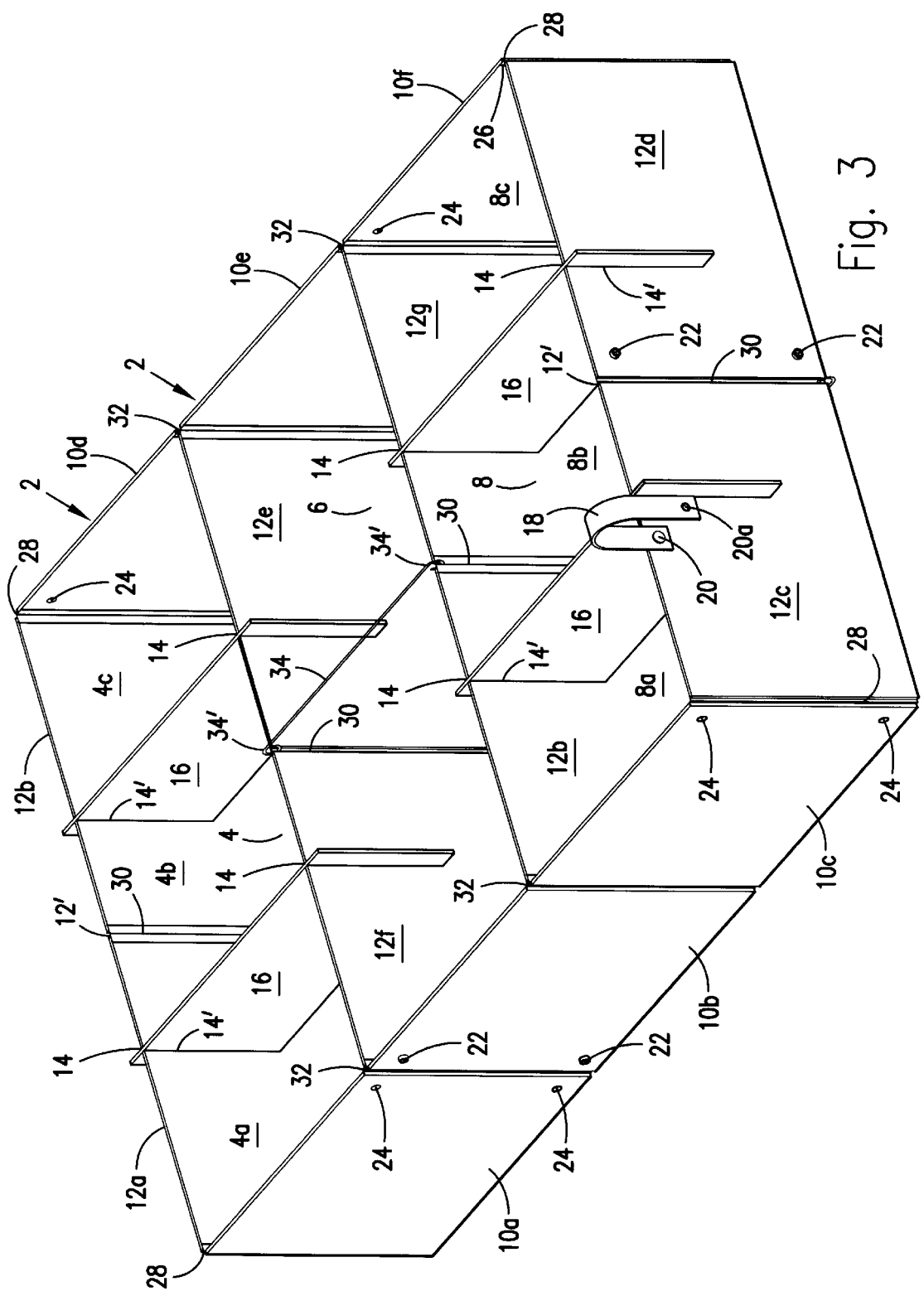
FIG. 3 is a side perspective view of the collapsible container of FIG. 1 in a fully open configuration and having divider inserts.

As seen in FIG. 1, the panels 12a, 12f, 12h and 12c have aligned slots to form subcompartments within the compartments 4, 6, 8, shown being present in compartments 4 and 8 in FIGS. 2 and 3. Similarly, panels 12b, 12e, 12g, and 12d of the pair of rows of intermediate panels have aligned slots 14 to form subcompartments. Divider panels 16 having a slot 16', open at their bottom and having a length greater than the length of the panels 10, 12, can be inserted into aligned slots 14 to extend between panels 12a and 12f, between panels 12b and 12e, between panel 12h and 12c, and between panel 12g and 12d as desired to divide compartment 4 into three subcompartments 4a, 4b and 4c and to divide compartment 8 into subcompartments 8a, 8b and 8c. As seen in FIG. 1, the slots 14 are generally equally distance from the corners of the collapsible article divider 2 in a fully open configuration to form three equally sized subcompartments in either compartments 4, 6 and 8 as shown. As best seen in FIGS. 1 and 3, a plastic handle member 18 is fixedly attached to end panel 12c by a mechanical fastener 20 and has a looped shape to form a free end 20a having an attachment element 20b in form of a snap element or Velcro element for attachment to a corresponding securement element provided on an opposite panel in the folded configuration of FIGS. 5 and 6.

As shown in FIGS. 1 and 3, each of the panels 10a, 10b, 10c, 10d, 10e, 10f and 12a, 12b, 12c, 12d, 12e, 12f, 12g and 12h includes an attachment element such as male snap element 22 or female snap element 24 (some of which are shown), at one upper end arranged in a manner that when the panels 10 and 12 are folded, the corresponding attachment elements of contacting panels can be engaged for securement. As further seen in FIG. 1, the attachment elements 22 or 24 may be within the compartment in its open configuration or on an external surface depending on the folding arrangement as will be apparent. The seams 10' and 12' interconnecting the respective panels 10 and 12 and seams 26 at the corners of divider 2 between panels 10 and 12 are provided with hinge elements for pivotally interconnecting the adjacent panels. At seam 26, a permanent flexible tape 28 is connected to the adjacent panels 10 and 12 forming the divider corners. Similarly, flexible tape 30 interconnects adjacent panels 12a, 12b; 12c, 12d; and 12f, 12e; 12h, 12g for pivotal movement at seam 12'. At seam 10', at pair of tapes 32 are used to interconnect the end to end relationship of the front and back panels 10a, 10b; 10b, 10c; 10d, 10e; and 10f, 10e and to further connect for pivotal movement the interior panels 12e, 12f, 12h and 12g respectively to front and back walls. It is within the scope of the invention to use other hinge elements, such as, metal and plastic hinges of any type which permit collapsibility in accordance with the invention.

Figure 4:
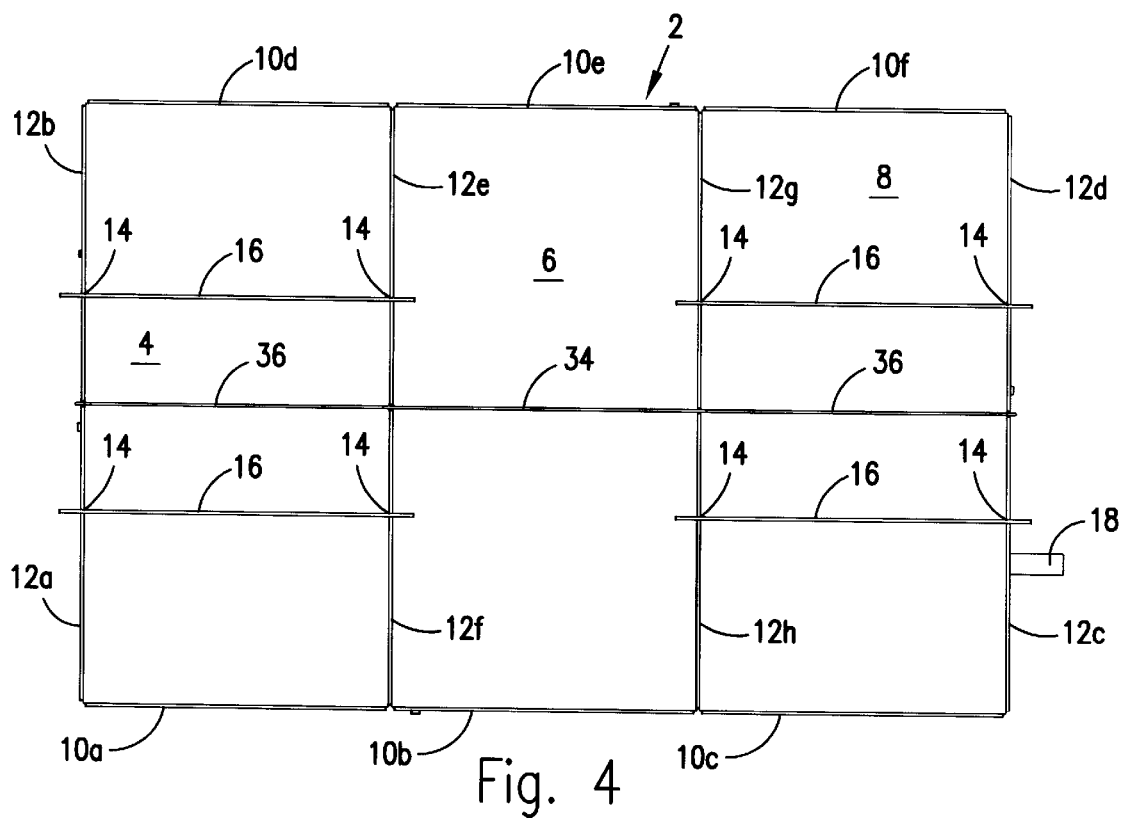
FIG. 4 is a bottom plan view of the collapsible divider of FIG. 3.

As seen in FIGS. 1 to 4, a upper rigid rod 34 is permanently attached to the collapsible article container between the interior panels 12e, 12f and panels 12g, 12h. The rod 34 is formed from a suitably strong metal or plastic material and it includes a hook end portion 34' to engage the flexible hinge material 30 in a secured permanent relationship. As seen in FIGS. 2 and 4, a similar lower rod 36 extends respectfully between side walls 12a, 12b and intermediate wall 12e, 12f and between side wall 12c, 12d and intermediate wall 12g and 12h. The lower rigid member 36 is identical to upper rigid member 34 and is likewise secured in permanent engagement with a lower portion of the seam 30 by a hook portion (not shown) or other suitable means of securement.

Referring to FIGS. 5 and 6, there is shown the collapsible article divider 2 in a total collapsed configuration for easy carrying and storage. In the collapsed configuration of FIGS. 5 and 6, the collapsible article divider 2 is capable of assuming a length of one panel whereby the handle 18 is orientated over the top of the folded layers of panels 10, 12 and is affixed to the rear panel whereby the attachment element 20b engages a corresponding snap element (not shown) on the rear panel to secure the handle. As stated previously, the fastening means can comprise other securement elements such as hooks, corresponding Velcro hooks and loops, and the like. It should be understood that in folding the collapsible article divider from the open configuration of FIGS. 1 to 4, the subdivider panels 16 are removed from the respective slots 14. It should be noted, however, that the upper rigid support member 34 and the two lower support members 36 do not require removal in order to fold the article of the collapsible divider article 2 into its compact configuration of FIGS. 5 and 6.

Figure 9:
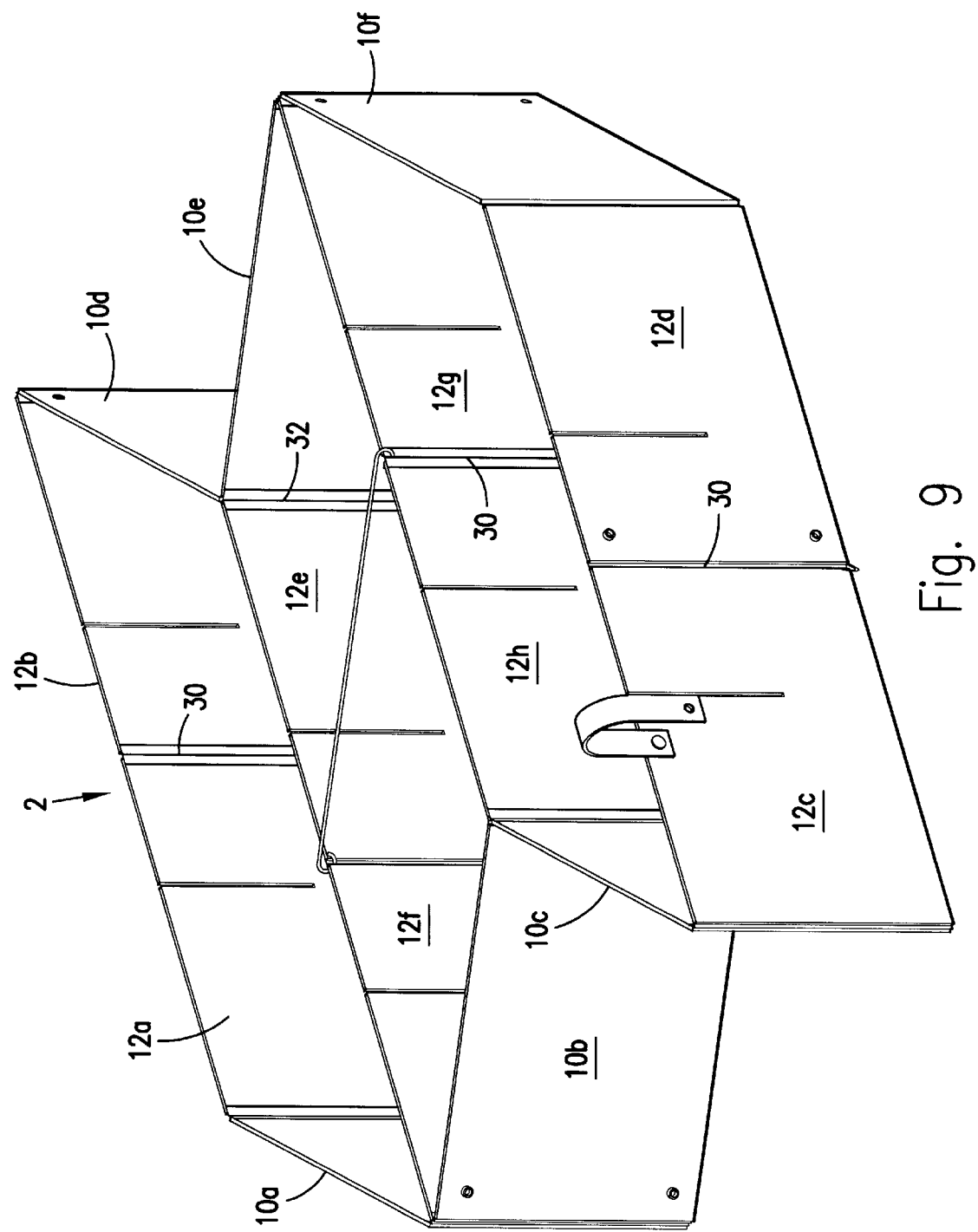
FIG. 9 is a front perspective view of the collapsible divider of FIG. 1 in a folded configuration between the fully open configuration of FIG. 1 and the folded configuration of FIG. 8.

Referring to FIG. 9, there is illustrated the configuration of the collapsible article divider 2 to show a technique of folding the divider 2 from the open position of FIGS. 1 to 4 the closed configuration of FIGS. 5 and 6. The same shape of the divider 2 would be assumed when unfolding the divider 2 as should be apparent. In FIG. 9, the folding of the collapsible divider 2 may commence by pivoting panel 10a relative to panel 12f, pivoting panel 10c relative to panel 10b, pivoting panel 10f relative to panel 12g, pivoting panel 10d relative to panel 10e and pivoting panel 12d and 12c relative to panel 12h and 10c, respectively. Also, panel 12a folds against panel 12c and panel 12b folds against panel 10d.

Figure 10:
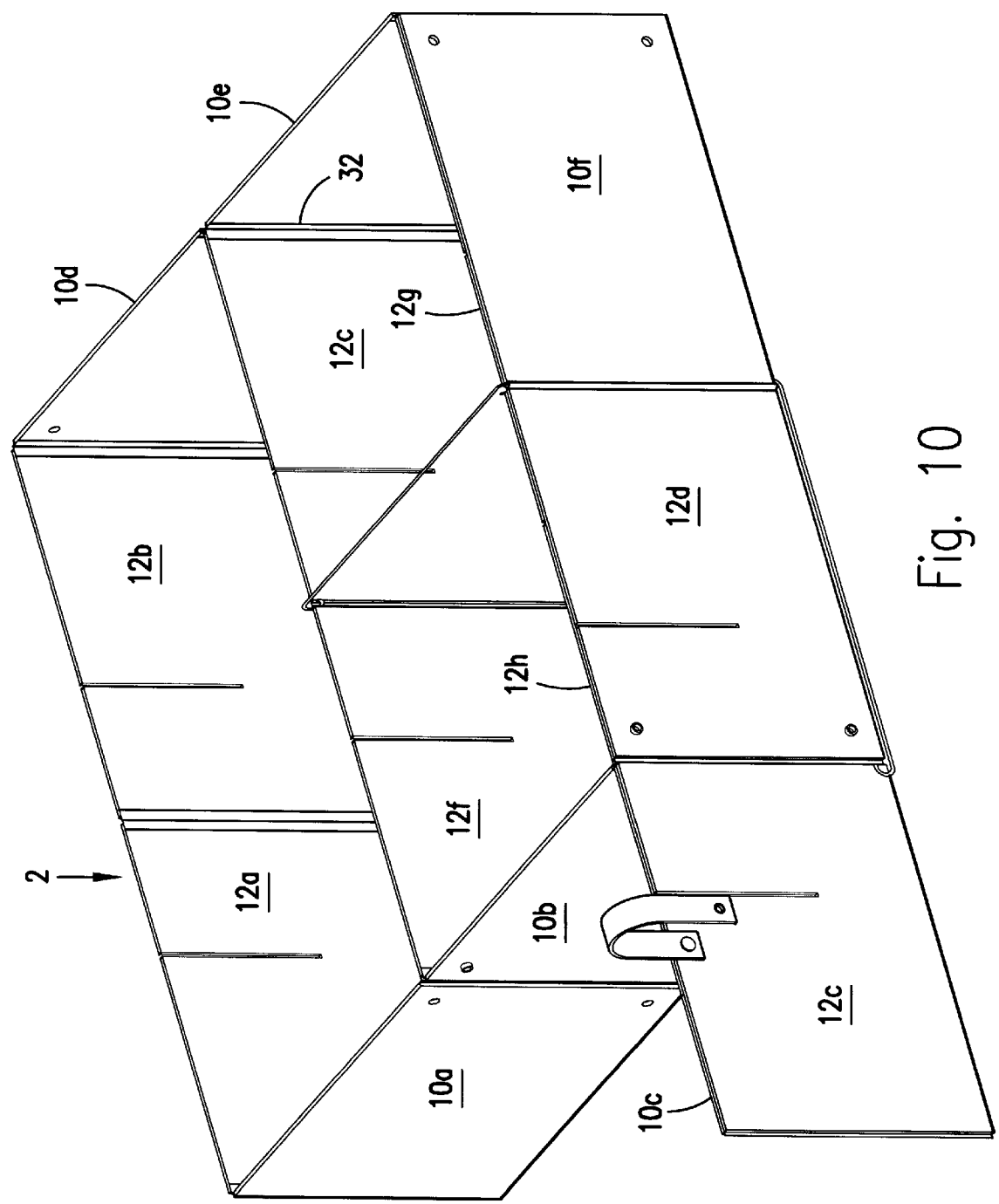
FIG. 10 is a front perspective view of the collapsible divider of FIG. 1 in a configuration further folded from the configuration of FIG. 9.

Referring now to FIG. 10, the further folding of the collapsible article divider 2 is shown by which panel 12c bears against panel 10c, panel 12d bears against panel 12h, and panel 10f bears against panel 12g. The collapsible article divider 2 can further be folded into the configuration of FIGS. 7 and 8 by folding panels 12c, 10c, 10b, 12f and 10a together, whereby the central section 2a of the partially folded divider 2 is formed by panels 12d, 12h, 12e and 12a in flattened relationship. The opposite ends of divider 2 are formed by panel 10f, 12g, 10e, 10d and 12b being in folded contacting relationship. As seen in FIGS. 7 and 8, the divider 2 is shown as having three separate sections of a plurality of panels whereby the sections are pivotally mounted with respect to each other through the hinging elements of the respective panel connections. From the three sectional folded configuration of FIG. 8 and the angular relationship of the three folded sections in FIG. 7, it is clear that the divider 2 can be folded into the flattened configuration of FIGS. 5 and 6 with panel 10a contacting panel 12a and panel 10f contacting panel 12d.

Figure 11:
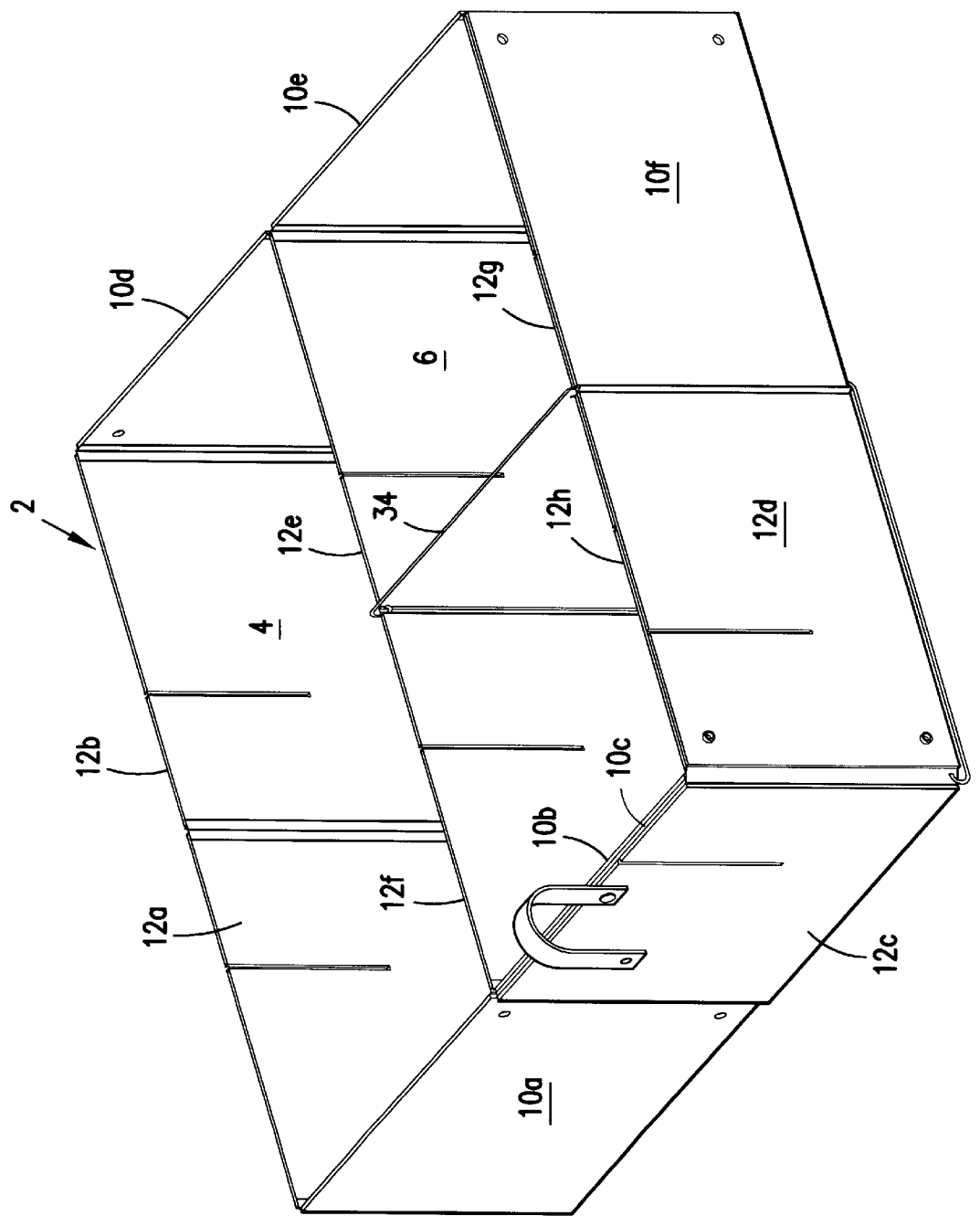
FIG. 11 is a front perspective view of the collapsible divider of FIG. 2 folded into two open sections.

In the foregoing description, a particular way of folding or unfolding the divider 2 was described to permit the divider to be either opened or collapsed. Referring now to FIG. 11, it should be noted that the divider 2 can be opened with a multiple number of folding steps as desired by the user. In FIG. 11, the divider 2 is shown opened into forming two separate compartments instead of three as illustrated in FIGS. 1 to 4. From the configuration of FIG. 9, it is clear that the divider 2 can be folded into a two compartment divider as FIG. 11 by folding panel 10f against panel 12g, folding panel 12d against panel 12h and folding panels 12c, 10c and 10d together. As a result, two compartments 4 and 6 are formed if desired.

Figure 12:
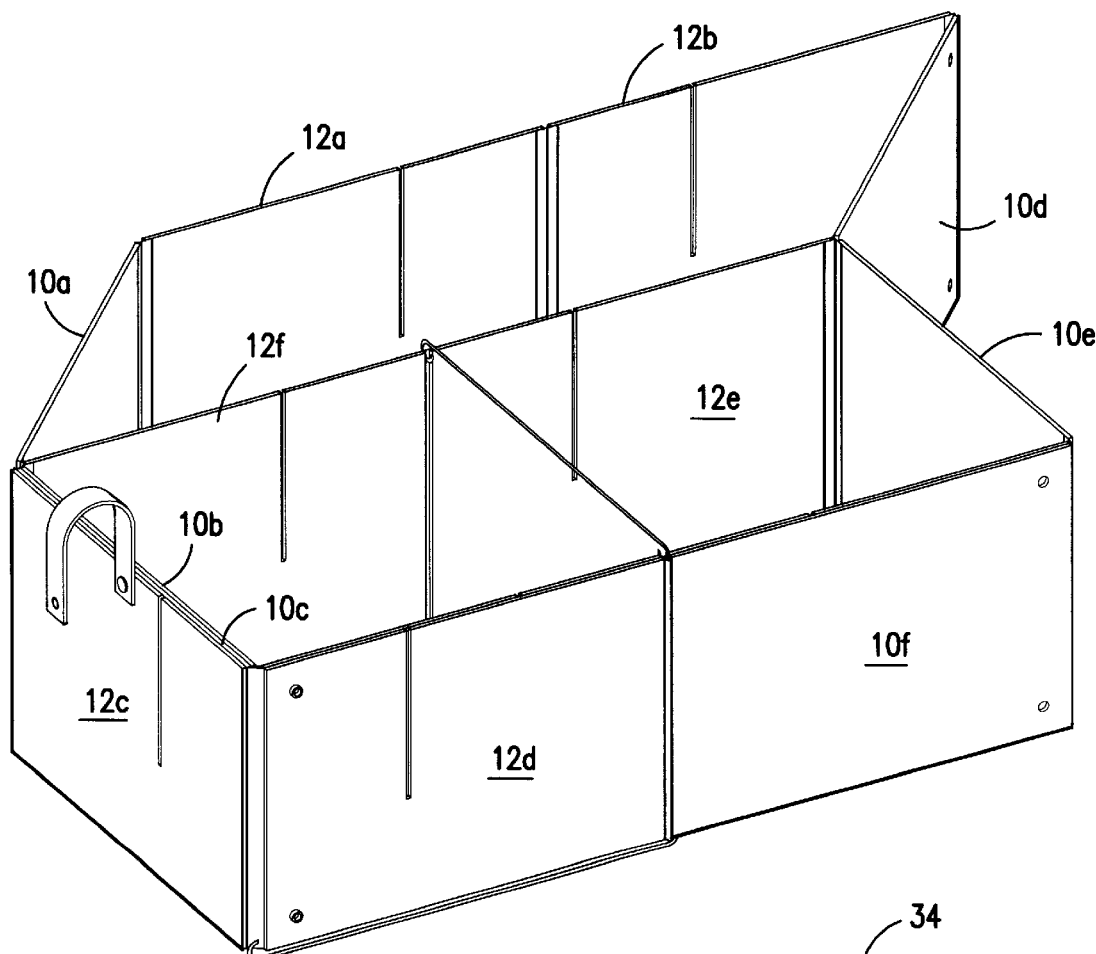
FIG. 12 is a front perspective view of collapsible divider of FIG. 1 being folded from the configuration of FIG. 11.
Figure 14:
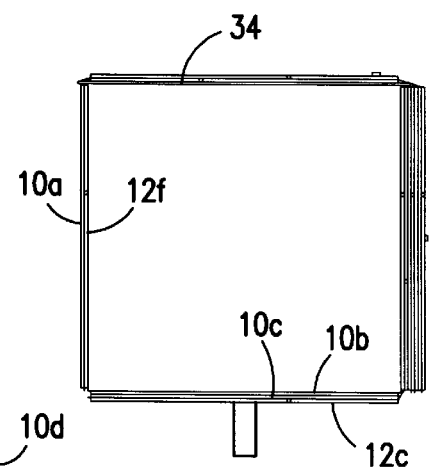
FIG. 14 is a top plan view of the collapsible divider of FIG. 1 folded into folded configuration having one open section.
Figure 13:
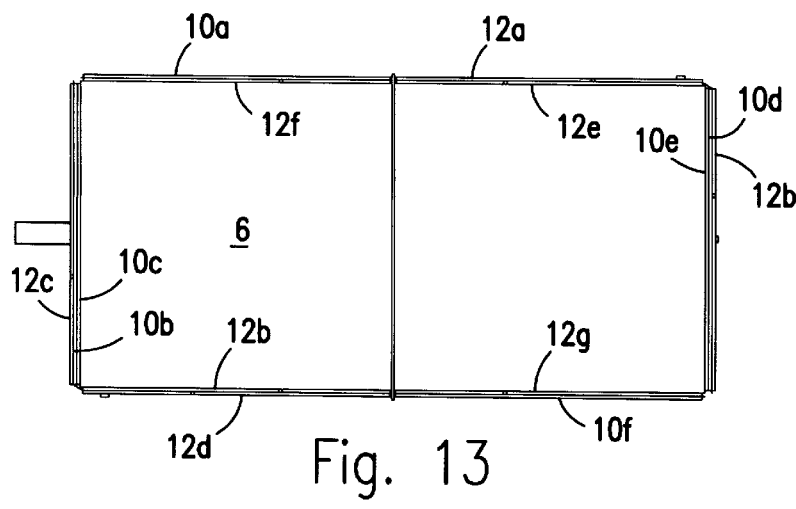
FIG. 13 is a top plan view of the collapsible divider of FIG. 1 folded into two open sections.

Referring now to FIGS. 12 and 13, there is illustrated how the divider 2 can be folded from a two section configuration of FIG. 11 to a one section configuration as in FIG. 13. Such a configuration can be obtained by folding the panel forming a portion of compartment 4 in a manner that panel 10a contacts panel 12f, panel 12a contacts 12e and panel 12d contacts 12b, and corresponding folds. Thus, a single compartment 6 is formed for intended use. In FIG. 14, there is shown how a half section 6 may be formed such as, for example, by being folded from the configuration of FIG. 13.

What is claimed is:

1. A collapsible article divider and support comprising
a plurality of interconnected flat vertical panels having equal lengths,
hinge means respectively interconnecting ends of adjacent ones of said plurality of panels for pivotal movement relative to each other,
said plurality of panels being arranged to be fully opened in an interconnected configuration forming a front wall, a back wall and a pair of opposed side walls together defining an enclosed article receiving space,
each of said front wall, said back wall and said side walls having adjacent pivotally attached ones of said plurality of panels, said front wall, said back wall and said side walls defining a plurality of peripheral vertical panels,
a plurality of intermediate vertical panels interconnected with said front wall and said back wall, and disposed in parallel relationship to said side walls in said fully opened configuration, said plurality of intermediate vertical panels being pivotally attached to said hinge means interconnecting said adjacent ones of said plurality of peripheral vertical panels forming said front wall and said back wall,
rigid support means being permanently attached to said side walls and said plurality of intermediate vertical panels for supporting said plurality of peripheral vertical panels, and
said plurality of intermediate vertical panels forming a plurality of separate compartments in said enclosed space,
said plurality of intermediate vertical panels includes two spaced walls of interconnected vertical panels, said interconnected vertical panels of said two spaced rows being pivotally interconnected, and
said rigid support means includes a plurality of rigid rods, at least one of said rigid rods being permanently affixed to said spaced rows of interconnected panels, said rigid support means further includes a plurality of rigid rods interconnected respectively between one of said spaced rows of interconnected vertical panels and one of said side walls.

2. The collapsible article divider and support according to claim 1 wherein said at least one rigid rod is attached to an upper portion of said two spaced rows of said intermediate panels.

3. The collapsible article divider and support according to claim 2 wherein said plurality of rigid rods are connected to a lower portion of said spaced rows of said intermediate panels and of said side walls.

4. The collapsible article divider and support according to claim 2 wherein said front wall and said back wall include an equal number of interconnected panels in said fully opened configuration and said opposed side walls each having an equal number of vertical panels to define said space in a generally rectangular shape.

5. The collapsible article divider and support according to claim 4 further comprising divider panels for being removably attached between each of said side walls and the confronting ones of said pair of spaced rows to further divide said compartments into sub-compartments for receiving articles.

6. The collapsible article divider and support according to claim 5 wherein said side walls include a plurality of open ended slots for receiving said divider panels, said divider panels have lower open slots for connection with a respective one of said opened ended slots of said side walls.

7. The collapsible article divider and support according to claim 4 wherein said front and back walls each include three interconnected panels and said opposed side walls each include a pair of interconnected panels in said fully opened configuration.

8. The collapsible article divider and support according to claim 7 wherein said two rows of interconnected intermediate panels each include a pair of interconnected intermediate panels of equal length as said plurality of peripheral vertical panels.

9. The collapsible article divider and support according to claim 7 wherein said two rows of intermediate panels are respectively interconnected to said hinge means interconnecting adjacent ones of said panels of said front wall and said back wall to form three equal size compartments in said enclosed article space in said fully opened configuration.

10. The collapsible article divider and support according to claim 9 wherein said at least one rigid rod includes a rigid rod respectively attached to said interconnection between said pair of panels of said spaced intermediate rows.

11. The collapsible article divider and support according to claim 10 wherein said plurality of rigid rods includes a pair of rods respectively affixed to said interconnection between said pair of panels of said spaced intermediate rows and said hinge means connecting said pair of peripheral vertical panels forming said spaced side walls.

12. The collapsible article divider and support according to claim 1 wherein said plurality of vertical panels are arranged to be folded into a flat configuration having said rigid means disposed within said plurality of folded panels.

13. The collapsible article divider and support according to claim 8 wherein said plurality of panels are foldable having selected panels of said front wall, said back wall and side walls being in contact and having selected panels of one of said side walls and one of said rows of spaced intermediate panels being in contact to form a pair of compartments with said enclosed article space.

14. The collapsible article divider and support according to claim 8 wherein selected ones of said vertical panels of said front walls, said back wall and said side walls being foldable together with said interconnected panels to form a single compartment forming a square configuration having dimensions formed by the length of a single panel.

\* \* \* \* \*